United States Patent
Sumida et al.

(10) Patent No.: US 9,985,678 B1
(45) Date of Patent: May 29, 2018

(54) SMARTPHONE CASE WITH HOOK

(71) Applicant: E-filliate, Inc., Rancho Cordova, CA (US)

(72) Inventors: Wesley K. Sumida, Fair Oaks, CA (US); Raymond C. Ramirez, Rancho Cordova, CA (US)

(73) Assignee: E-filliate, Inc., Rancho Cordova, CA (US)

( * ) Notice: Subject to any disclaimer, the term of this patent is extended or adjusted under 35 U.S.C. 154(b) by 0 days. days.

(21) Appl. No.: 15/474,882

(22) Filed: Mar. 30, 2017

Related U.S. Application Data

(60) Provisional application No. 62/316,171, filed on Mar. 31, 2016.

(51) Int. Cl.
*H04B 1/03* (2006.01)
*H04M 1/06* (2006.01)
*H04B 1/3888* (2015.01)
*H04M 1/02* (2006.01)

(52) U.S. Cl.
CPC ........ *H04B 1/3888* (2013.01); *H04M 1/0202* (2013.01)

(58) Field of Classification Search
CPC ..... H04B 1/3888; H04B 1/03; H04M 1/0202; H04M 1/0208; H04M 1/72575; H04M 1/0283; H04M 1/06
See application file for complete search history.

(56) References Cited

U.S. PATENT DOCUMENTS

| | | | | |
|---|---|---|---|---|
| 2008/0164291 | A1* | 7/2008 | Goradesky | A45F 5/02 224/269 |
| 2012/0162926 | A1* | 6/2012 | Duan | H04M 1/0237 361/727 |
| 2015/0175309 | A1* | 6/2015 | McGowan | B65D 25/2882 224/191 |
| 2016/0294201 | A1* | 10/2016 | Avital | H01R 31/065 |
| 2016/0308569 | A1* | 10/2016 | Wei | H04B 1/3883 |
| 2016/0344437 | A1* | 11/2016 | Gordon | H04B 1/3888 |
| 2017/0099922 | A1* | 4/2017 | Guerdrum | A45F 5/021 |
| 2017/0149941 | A1* | 5/2017 | Roux | H04B 1/3888 |

* cited by examiner

*Primary Examiner* — Andrew Wendell
(74) *Attorney, Agent, or Firm* — Heisler & Associate

(57) ABSTRACT

The smartphone case has a compartment for a smartphone and also includes a hook which can be moved between a collapsed orientation adjacent to a rear surface of the smartphone case and a deployed orientation. In the deployed orientation, the hook can be placed over a wall or other elevated structure and the smartphone within the case can be suspended below. Alternatively, the smartphone can rest up from an edge thereof placed upon an underlying surface, and the hook positioned to also rest upon the underlying surface. The hook can both pivot and swivel in preferred embodiments, so that it can be positioned optimally to support the smartphone in a desired orientation. An optional second hook can also be provided. The rear surface preferably includes a recess therein to allow at least portions of the hook to be nested within the recess when in the collapsed orientation.

15 Claims, 2 Drawing Sheets

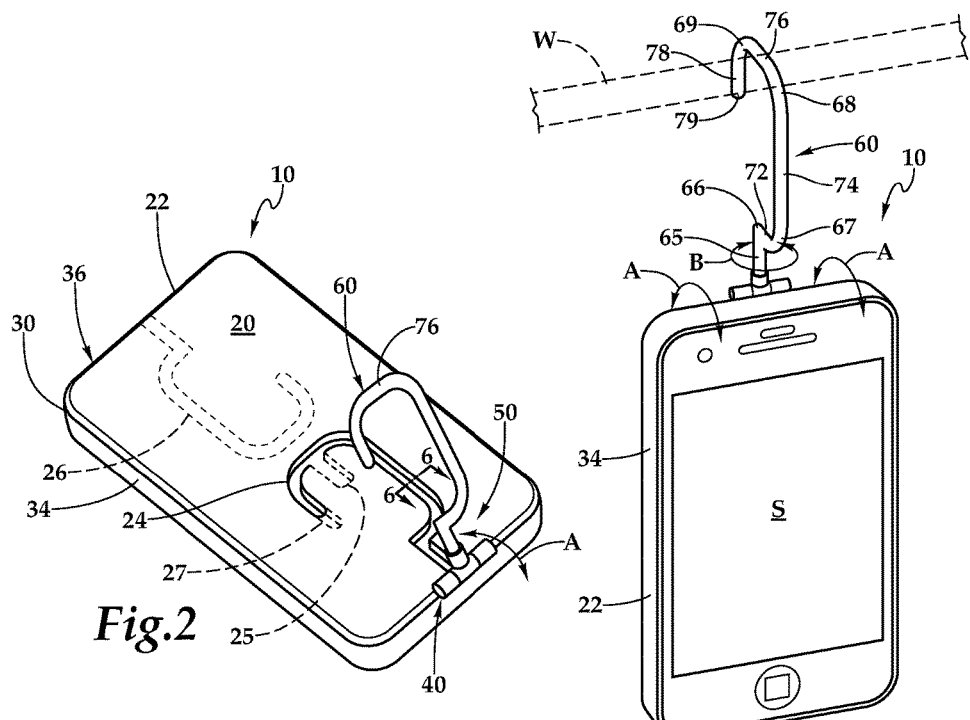
Fig.1
Fig.2
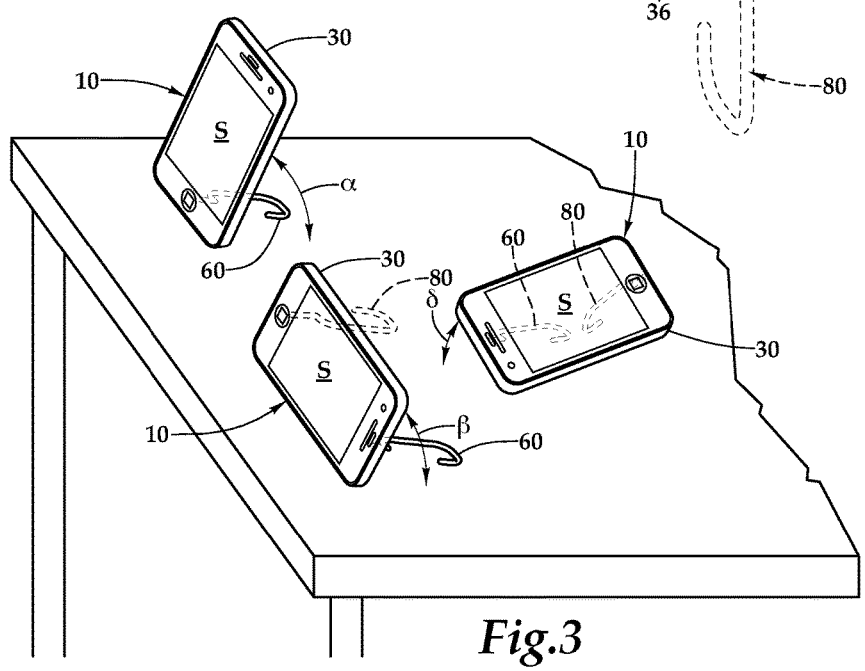
Fig.3

SMARTPHONE CASE WITH HOOK

CROSS-REFERENCE TO RELATED APPLICATIONS

This application claims benefit under Title 35, United States Code § 119(e) of U.S. Provisional Application No. 62/316,171 filed on Mar. 31, 2016.

FIELD OF THE INVENTION

The following invention relates to cases for smartphone type devices. More particularly, this invention relates to cases for smartphones which include a hook thereon for suspending of the smartphone and associated smartphone case from a variety of different objects or resting the smartphone at various angles upon underlying surfaces.

BACKGROUND OF THE INVENTION

Portable electronic devices of the hand-held variety come in a variety of different configurations. One such portable electronic device is commonly referred to as a smartphone and includes as two primary features the functionality of a wireless (e.g. cellular) telephone and a display coupled to a processor and memory so that the smartphone can run software applications thereon (typically referred to as "apps") to provide a virtually unlimited variety of functions. Examples of such smartphones include personal electronic devices provides by Apple, Inc. of Cupertino, Calif. under the trademark IPHONE and portable electronic devices provided by Samsung Electronics Co., Ltd. of Korea, such as those provided under the trademark GALAXY.

While the term "smartphone" can in some instances be limited to only those portable electronic devices which include full wireless telephone capability, other portable electronic devices can generally be considered to be within the category of a "smartphone" for purposes of this application. For instance, some generally larger portable electronic devices are referred to as "tablets" and have many or all of the capabilities of a smartphone other than the telephone related functions. Some tablets can even include some or all of the telephone functions of a smartphone. Still other portable electronic devices which can be considered within the definition of a "smartphone" for purposes of this application include portable electronic devices which are similar to a smartphone except for without some or all of the telephone capabilities, such as those products provided under the trademark IPOD by Apple, Inc.

Many smartphone users desire to place their smartphone (including tablets and other smartphone related portable electronic devices) within a case. Such a case is shaped and sized to allow the smartphone to fit snugly within a recess therein and to provide a typically thin extra layer covering at least a perimeter of the smartphone and often also a rear side of the smartphone and rolling over slightly onto a front side of the smartphone directly adjacent to a perimeter thereof. Such smartphone cases are primarily provided to add extra protection to shield the smartphone in case it is dropped or otherwise struck with a blow. Smartphone cases also allow for an opportunity to personalize the smartphone with colors and other decorations.

In at least some instances smartphone cases are also known to provide other ancillary features such as to assist in suspending or otherwise holding the smartphone in various different positions. For instance, it is known to provide suction cups which allow smartphones to be suspended from the inside of a windshield or other smooth surface. Also, it is known to provide structures to facilitate suspension of a smartphone from louvers of a car HVAC outlet, such as that disclosed in U.S. Pat. No. 8,636,183 to Steiner. Basic kickstands built into smartphone cases, such as those provided by Spigen, Inc. of Irvine, Calif. under the trademarks SPIGEN and U100. However, a need exists for further accessories to allow for convenient orientation of the smartphone where desired, especially for hands-free operation in a variety of different environments.

SUMMARY OF THE INVENTION

With this invention a case is provided which has a multi-purpose hook integrated therein. When not in use, the hook preferably recedes at least partially into a recess in a rear surface of the case housing a smartphone. The case has a general configuration including a perimeter wall perpendicular to a rear wall. The rear wall is sized similar to a rear surface of a smartphone and the perimeter wall is sized with a height similar to a thickness of the smartphone. The perimeter wall is particularly sized and shaped so that the smartphone can nest inside the case and be held securely therein. Typically, such a case needs to be sized for a particular model of smartphone or a small subset of models of smartphones to securely attach to the smartphone. The smartphone case can include apertures therein such as to allow a camera lens on the rear surface of the smartphone to operate through the case. Similarly, holes, slots or flexible wall areas are provided over buttons for the particular model of smartphone with which the case is to be utilized, so that buttons on a perimeter of the smartphone can be accessed through this perimeter wall.

The hook preferably has at least one joint in the form of a pivot joint which pivotably attaches the hook to a corner of the smartphone case at a corner or other junction between the rear wall of the smartphone case and the perimeter wall of the smartphone case, typically at an upper portion of the smartphone case. Preferably, this pivot joint is in the form of a standard hinge with at least one knuckle on the hook element and at least one knuckle on the case. A pintle is provided which passes through the at least one knuckle affixed to the hook and the at least one knuckle affixed to the case, which allows for articulation about the pintle so that the hook can pivot between a collapsed position and a deployed position. The pintle can be separate from just one or from both of the knuckles. Other forms of hinges could alternatively be used.

The collapsed position optionally places the hook at least partially into the recess in the rear surface of the case. The recess is preferably sized and shaped so that the hook nests at least partially into the recess when in the collapsed orientation. In one embodiment, the hook has a size and shape which allows it to be completely nested into the recess when in the collapsed orientation and filling up the recess entirely. In other embodiments, the recess is only partly filled. The pivot joint preferably allows the hook to pivot at least 180° from the collapsed orientation to a deployed orientation. Amounts of rotation up to and even exceeding 270° could conceivably be provided while in some instances it may be desirable to limit pivoting about the pivot joint to less than 180°.

In the preferred embodiment, a swivel joint is also provided joining the hook to the case. The swivel joint preferably allows for rotation about a central axis along which the hook extends away from the case and away from the pivot joint. For instance, a collar portion of the pivot joint, which pivots relative to the case, can be hollow and cylindrical in form. A proximal base end of the hook can have a cylindrical form sized small enough to fit within the collar and an associated bore which is adjacent to the pivot joint. The proximal end of the hook is captured within this cylindrical collar structure in a manner allowing the proximal end of the hook to freely rotate within the bore of the swivel joint, but without allowing translation linearly into or out of the swivel joint.

Various different types of swivel joints known in the art could be utilized to provide this swivel joint. Similarly, various alternative pivot joints could be provided to function as the pivot joint according to this invention as is known in the art of pivot joints.

Most preferably, the pivot joint and the swivel joint are not low friction, but rather relatively high friction joints. The friction within the joints is preferably designed so that when the hook is pivoted and/or swiveled to a desired orientation by hands of a user, the hook will hold that orientation even when encountering forces and torques applied thereto by the weight of the case and smartphone in any conceivable orientations. The hook can thus be utilized as a form of prop to hold the smartphone in various different orientations resting upon a tabletop or other surface which is horizontal or somewhat close to horizontal.

In a first smartphone orientation, the hook is rotated about 60° away from the recess and the smartphone can rest upon the hook with the smartphone angled 120° away from the tabletop. In a second smartphone orientation depicted in FIG. 3 the hook is rotated approximately 90° away from the recess and the smartphone is oriented at an angle 150° away from the tabletop. In a third smartphone orientation the hook is rotated approximately 45° away from the recess and the smartphone is able to rest upon the tabletop at an angle about 120° away from the tabletop.

By providing the pivot joint and swivel joint with sufficient friction, the hook can be pivoted to a desired position away from the recess and the hook rotated about the swivel joint with sufficient friction, the hook can be pivoted to a desired position away from the recess and the hook rotated about the swivel joint to a desired orientation and then the smartphone can rest upon the tabletop or other surface at a desired orientation. A user can then view the smartphone without requiring the smartphone to be held by hands of a user. Such positioning can be particularly desirable when a user wishes to watch a video or enjoy a photograph or otherwise use the smartphone in a manner which involves passive viewing, rather than active manipulation thereof. Furthermore, the pivot joint and swivel joint are preferably high in friction so that if occasional touching of the touchscreen of the smartphone is desired by the user while the smartphone is so resting upon the tabletop, such pressure associated with touching the touchscreen will not cause the hook to pivot or swivel appreciably.

Typically, such friction within the pivot joint and/or swivel joint is provided by fitting the various parts of these joints to have interference fits between adjacent structures so that friction is encountered as rotation occurs. Material selection can also occur to optimize desired friction forces. As an alternative, such friction could be provided in other manners. In one embodiment various different detents could be provided so that the hook pivots and/or swivels between small incremental positions where the hook tends to snap securely into different positions of articulation and hold those positions of articulation until sufficient force is applied to push the hook past such detents for further pivoting or swiveling. Such detents could be provided at 15°, 30°, 45° or 60° increments (for example) to allow for selection of the position of the hook as desired.

When the hook is rotated approximately 180° it can conveniently be utilized to hang the smartphone from a wall peg, top of a cubicle wall or other divider, or other available suspension structure. If the structure from which the smartphone is to hang extends away from a wall surface from which the hook is to engage, such as a nail or peg extending from the wall, the hook would be pivoted approximately 180° away from the recess but not swiveled. It could then hang upon such a peg, nail or other hanging structure. If the hook is to hang over the top of a cubicle wall or some other structure which extends approximately parallel with a surface of the wall, the hook could be swiveled, such as 90° away from its orientation when fitting within the recess, so that the hook is in optimal position for engaging such a suspension structure. The smartphone is then available to display a picture, calendar, etc. or for convenient viewing of a video, video conferencing, and also potentially for interaction through the touchscreen while suspended from the hook.

The hook can have any of a variety of different configurations. In one embodiment the hook has a proximal end which extends along a centerline through a trunk linearly away from the cylindrical base end forming part of the swivel joint. After extension a short distance, the hook is bent about a 90° elbow into a short arm and then bends a second time to follow a long arm which extends parallel to the first base leg at the proximal end. A distal portion of this long arm bends about a 90° elbow to a support arm which is longer than the short arm and terminates at an elbow which bends approximately 90° to an end arm which returns back toward the trunk somewhat before reaching a distal tip. The various bends between the various arms can be abrupt 90° corners or gradually curving 90° corners. The legs can be linear or have other contours such as continuously sweeping curves, zig-zags, or other fanciful or functional shapes.

Preferably the recess has a contour which matches that of the hook so that when the hook is collapsed into the recess the hook can in one embodiment be barely visible. The hook can be formed of an alternative color (or pattern) to the case so that it stands out visibly and its function can be readily seen by a user, or can match the case color (or pattern) to hide this hook.

A portion of the recess can be slightly oversized to allow a finger or fingernail to reach under the hook conveniently to lift the hook out of the recess and pivot it, about the pivot joint, to a desired angle of deployment. The hook can have a square-ish or flattened cross-section to fit within a thin recess and not stick out of the case if desired. As another alternative, the hook can have a cross-section which is approximately circular. The case rear wall can be sufficiently thick so that such a circular cross-section hook can entirely collapse into the recess, or the hook can be allowed to protrude slightly out of a portion of the recess, which can also assist in grasping the hook for removal out of the recess when use of the hook is desired.

In one embodiment, an optional second hook can be provided at an end of the case opposite the location of the first hook. Such an optional second hook would in a preferred embodiment have a similar structure to that of the first hook but be pivoted from an opposite end of the case. Such an optional second hook would have a variety of different purposes. In one embodiment both hooks could be simultaneously deployed somewhat for secure supporting of the smartphone upon a tabletop, such as when in the third smartphone orientation described above, and with each of the hooks pivoted out of their corresponding recesses approximately 45°. Furthermore, such an optional second hook could be deployed 180° when the first hook is also deployed 180° for hanging from a peg, nail or other structure, so that the optional second hook can be available for supporting of other items. In one embodiment, multiple smartphones or other smart devices, such as tablet computing devices, could be suspended together. In other embodiments, other items such as keys, pictures, etc. could be suspended from the optional second hook while the first hook is utilized suspending the smartphone itself.

Furthermore, such an optional second hook could allow for the smartphone to be supported upon a tabletop or other horizontal surface in either a right side up or an upside down orientation. For instance, in the first smartphone orientation described above the hook, being in an optimal position at an upper end of the smartphone case, requires the smartphone to be upside down with its "home button" at a top of the smartphone. In many instances, such an orientation is not optimal. With the optional second hook, the optional second hook can be utilized alone while the first hook remains collapsed within its recess and an orientation similar to the first smartphone orientation described above can be provided, but with the home button at a lower end of the smartphone.

OBJECTS OF THE INVENTION

Accordingly, a primary object of the present invention is to provide a smartphone case which allows the smartphone to be suspended from an object, such as a top of a wall, a horizontally extending bar, a downwardly extending hook, a horizontally or vertically extending peg or other support structures.

Another object of the present invention is to provide a smartphone case which allows the smartphone to be suspended from either an object through a hook, or to be suspended upon a horizontal surface (or surface closer to horizontal than to vertical), and at an angle other than facing straight up or straight down, for viewing thereof when out of a user's hands.

Another object of the present invention is to provide a smartphone case which has a slim profile when a hook thereof is not in use, and which allows the hook to be deployed for suspension of the smartphone when desired.

Another object of the present invention is to provide a method for suspending a smartphone through a hook or from an underlying surface.

Another object of the present invention is to provide methods and apparatuses for facilitating viewing of a smartphone without requiring the smartphone to be held by the user.

Another object of the present invention is to provide a smartphone case with a hook associated therewith that can both pivot and swivel so that an optimal orientation of the smartphone can be achieved while suspending the smartphone from the hook associated with the smartphone case.

Other further objects of the present invention will become apparent from a careful reading of the included drawing figures, the claims and detailed description of the invention.

BRIEF DESCRIPTION OF THE DRAWINGS

FIG. 1 is a perspective view of the smartphone case of this invention with a smartphone therein and with a hook of the smartphone case shown in a fully deployed orientation and with a wall shown in broken lines illustrating how the hook can allow the smartphone to be suspended from a top of a cubicle wall or similar wall.

FIG. 2 is a perspective view of that which is shown in FIG. 1, but with the hook shown pivoted partway toward a collapsed orientation, and revealing details of a recess in a rear wall of the smartphone case provided for containing at least a portion of the hook therein, and with an optional second hook shown in broken lines.

FIG. 3 is a perspective view of a tabletop revealing embodiments of this invention where one or two hooks are suspended from the case and positionable in various different ways to facilitate angled support of the smartphone and smartphone case upon a tabletop (or other underlying structure), and at different viewing angles.

DESCRIPTION OF THE PREFERRED EMBODIMENT

Figure 4:
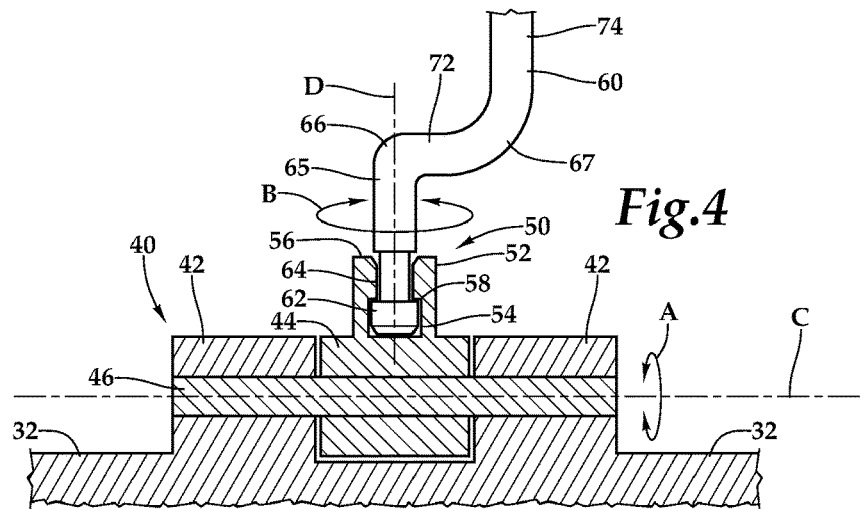
FIG. 4 is a full sectional view of a pivot joint and swivel joint of the smartphone case according to one embodiment of this invention, which facilitates swiveling and pivoting of the hook relative to the smartphone case.

Referring to the drawings, wherein like reference numerals represent like parts throughout the various drawing figures, reference numeral 10 is directed to a smartphone case which includes a compartment for holding a smartphone S (or similar device) therein (FIG. 1). The case 10 includes a rear wall with a rear surface 20 (FIG. 2) and with a perimeter wall 30 extending forward from the rear wall, with the smartphone S compartment inboard of the perimeter wall 30. A hook 60 attaches to the case 10, preferably at a corner junction between the perimeter wall 30 and the rear surface 20 at a "top" of the case 10, so that the hook 60 can suspend the smartphone S from various items, such as a cubicle wall W. The hook 60 can also be used for supporting of the smartphone S at an angle for viewing, such as resting upon a tabletop (FIG. 3).

In essence, and with particular reference to FIGS. 1 and 2, basic details of the smartphone case 10 are described, according to this preferred embodiment shown. The rear surface 20 and perimeter wall 30 are preferably formed together from resilient material defining a basic smartphone S case. A hinge 40 and swivel 50 provide a pivot joint and swivel joint, respectively, for attaching the hook 60 to the case 10. The hook 60 can pivot and swivel relative to the case 10 for optimal positioning of the hook 60, either for suspension of the smartphone S from an object, or to assist in holding the smartphone S at a desired angle for viewing when resting upon a tabletop or other object.

More specifically, and with continuing reference to FIGS. 1 and 2, basic details of the case 10, including the rear surface 20 and perimeter wall 30 are described, according to a most preferred embodiment disclosed herein. The case 10 according to this invention can be configured similar to any of a variety of different types of smartphone cases which generally act to protect the smartphone S from damage when dropped, and to some extent provide other features such as a more grippable exterior surface and to protect the smartphone from scratches, dents, etc. Uniquely with this invention, at least one hook 60 is coupled thereto, as described below in detail.

In the particular embodiment shown, the smartphone case 10 includes a rear wall defined on a rear side by a rear surface 20 and with a perimeter wall 30 extending from the rear wall on a forward side of the rear wall opposite the rear surface 20. As seen primarily in FIG. 2, the rear surface 20 includes edges 22 defining a shape of the rear surface 20 and rear wall as generally rectangular with slightly rounded corners. Other shapes could be provided, which most commonly generally match a shape of the smartphone S being contained. The perimeter 30 extends perpendicularly away from these edges 22 of the rear surface 20 of the rear wall in a forward direction. Corners are thus defined where the perimeter wall 30 extends away from the edges 22 of the rear surface 20.

A recess 24 preferably extends into the rear surface 20 at least somewhat. This recess 24 preferably has a contour matching that of the hook 60. The recess 24 could have a shape which closely matches the geometry of the hook 60, or less closely has a shape generally in a hook shape and containing at least portions of the hook 60, but not necessarily closely following the form of the hook 60. In another embodiment, the recess 24 could be large enough to receive the hook 60 therein but not necessarily have a hook shape.

Figure 6:
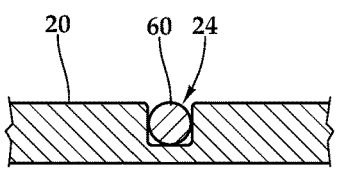
FIG. 6 is a sectional view taken a long lines 6-6 of FIG. 2 and illustrating one contour for the hook and recess according to a first embodiment.
Figure 7:
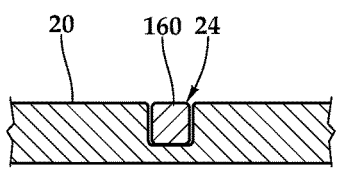
FIG. 7 is a sectional view of that was shown in FIG. 6, but for a second embodiment with the hook having a square contour.

The recess 24 typically extends just partially into the rear surface 20 (FIGS. 6 and 7), but can optionally extend entirely through the rear wall, from the rear surface 20 to the forward side opposite the rear surface 20 which bounds a compartment into which the smartphone S is placed, inboard of the perimeter wall 30. The recess 24 can optionally include a finger slot 25 it with a finger or other elongate item can be placed to get at least partially beneath the hook 60 and assist in pivoting the hook 60 out of the recess 24. As an alternative to the fingers slot 25 (or in addition thereto) an extension 27 at an end of the recess 24 can be provided so that one can reach under a portion of the hook 60 at a tip 79 of the hook 60, to reach under the hook 60 and assistant in pivoting the hook 60 out of the recess 24. An optional second recess 26 can be provided in the rear surface 20 for containing an optional second hook 80 (FIG. 1) opposite the main hook 60.

The perimeter wall 30 preferably includes a top wall 32 opposite of bottom of 36, and with sidewalls 34 extending between the top wall 32 and bottom wall 36, and with each of these walls 32, 34, 36 each extending from the rear wall and forming a corner with the rear surface 20. Optionally, the perimeter wall 30 and rear wall are formed together from a common material. Most preferably, at least the perimeter wall 30 is formed of a material that has resilient characteristics so that it will return to an original shape after loads are placed thereon. The compartment inboard of the perimeter wall 30 has a geometry, especially at the perimeter wall 30 which causes the smartphone S to be trapped somewhere within the compartment so the smartphone S remains securely held within the compartment of the smartphone case 10. Typically, the perimeter wall 30 will include holes therein which allow buttons and/or ports on an edge of the smartphone S to be accessed through the perimeter wall 30.

The hook 60 is connected to the smartphone case 10, preferably through a compound joint which includes a pivot joint and a swivel joint together within one common structure. In particular, this structure includes a hinge 40 and a swivel 50. The hinge 40 facilitates pivoting of the hook 60 relative to the smartphone case 10 (about arrow A of FIGS. 1 and 2). The swivel 50 facilitates rotation (about arrow B of FIG. 1). This embodiment discloses one configuration for the hinge 40 as a preferred form of pivot joint and one configuration for the swivel 50 as a preferred form of swivel joint. Variations on these embodiments for the joints 40, 50 could alternatively be utilized.

Figure 5:
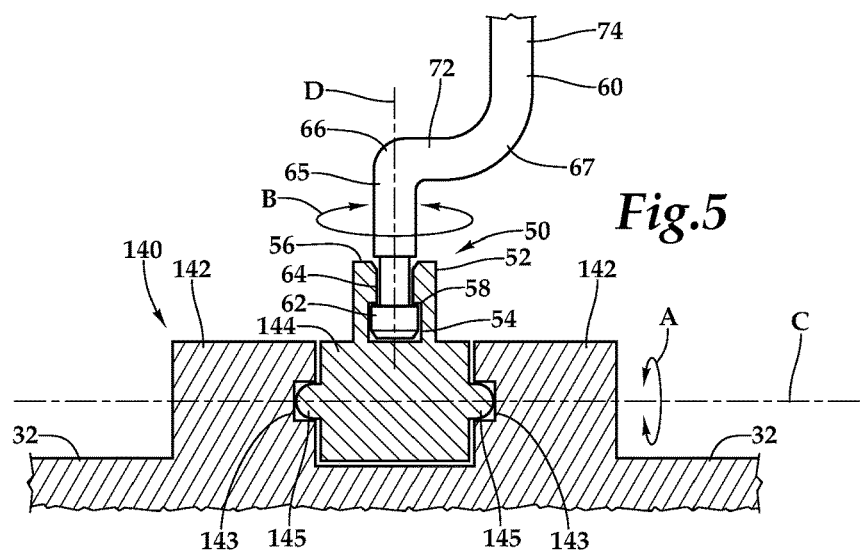
FIG. 5 is a sectional view similar to that which is shown in FIG. 4, but for an alternative embodiment of the pivot joint provided between the hook and the smartphone case.

With particular reference to FIGS. 4 and 5, particular details of these joints 40, 50 are described, according to this preferred embodiment. The hinge 40 preferably includes two fixed knuckles 42 affixed to the case 10. Most particularly, this hinge 40 is located at a corner between the perimeter wall 30 (and most particularly the top wall 32 portion of the perimeter wall 30) and the rear surface 20. A centerline C defines a pivoting axis for this hinge 40, with this centerline C parallel with the corner between the top wall 32 and the rear surface 20. The fixed knuckles 42 surround a barrel which includes a pintle 46 therein, extending along the central axis C.

A pivoting knuckle 44 is also supported upon the pintle 46, and between the at least two fixed knuckles 42. This pivoting knuckle 44 also supports the hook 60 thereon. In this way, the hook 60 can pivot about the pintle 46 and relative to the smartphone case 10. Other forms of hinges 40 or other pivot joints could be provided, such as a hinge with greater than two fixed knuckles (or just one) and greater than one pivoting knuckle, or including other types of pivot joints which facilitate rotation and which are known in the mechanical arts.

In FIG. 5 an alternative embodiment is disclosed where an alternate hinge 140 is provided. Fixed knuckles 142 are spaced apart by a space in which a pivoting knuckle 144 is located. With this alternate hinge 140, the fixed knuckles 142 each include blind bores extending along a centerline C at least partially into the fixed knuckles 142. The pivoting knuckle 144 includes posts 145 also extending on the centerline C, which pass partially into the blind bores 143, so that the pivoting knuckle 144 can pivot relative to the fixed knuckles 142, by pivoting of the posts 145 within the blind bore 143.

With either the mechanism in FIG. 4 or the mechanism of FIG. 5 (or others), a hinge 40, 140 is provided which allows for pivoting rotation (about the centerline C along arrow A so that the hook 60 can pivot away from a more collapsed orientation adjacent to the rear surface 20, and toward a more deployed orientation (see FIG. 1) for suspension from some object). The hook 60 could merely collapse against the rear surface 20 of the case 10, but preferably the hook 60 pivots about the hinge 40, allowing the hook 60 to be recessed at least partially into the recess 24 when so collapsed. As needed, the swivel 50 can be offset relative to the pintle 46 and central axis C somewhat to allow the hook 60 to most fully nest within the recess 24 of the rear surface 20.

The swivel 50 is preferably located between the hinge 40 and the hook 60. Alternatively, the swivel 50 could be positioned between the hinge 40 and the case 10. In this embodiment, the swivel 50 is incorporated into the pivoting knuckle 44 of the hinge 40. In particular, the pivoting knuckle 44 includes an extension which terminates at a collar 42 surrounding a bore 54. A face 56 is adjacent to this collar and defines a portion of the swivel 50 most distant from the pintle 46. Interior details of this swivel 50 include the bore 54 extending down into the swivel somewhat, and preferably with the bore 54 having a greater width at a deepest portion thereof then at a portion of the bore 54 adjacent to the collar 52. The hook 60 has a base end 62 and groove 64 generally matching a contour of this bore 54, so that the base end 62 of the hook 60 can snap into the swivel 50. However, the base end 62 and groove of the hook 60 is preferably round (or faceted) in cross-section and the bore 54 is perfectly round (or faceted) in cross-section so that the hook 60 can rotate relative to the bore 54 either smoothly (or snapping between defined positions if faceted).

It is desirable that the hook 60 will remain where positioned by a user, and not be influenced by forces of gravity acting on the hook 60 or acting upon the smartphone S and case 10. In one embodiment, the hook 60 can have a circular cross-section at the base end 62 and the bore 54 in the swivel 50 can also have a circular cross-section. A friction fit can be provided between the base end 62 and bore 54 so that swivel rotation of the hook 60 through the swivel 50 holds its position wherever the user stops rotating the hook 60.

As an alternative, rotation can be limited to discrete rotational displacement orientations. As one example, the base end 62 could have a cross-section which is hexagonal and the bore 54 could have a similar hexagonal cross-section, and with a small amount of tolerance gap therebetween. Forming the case 10 and/or hook 60 out of resilient material, and with sufficient tolerance, rotation is resisted somewhat (about arrow B of FIGS. 1, 4 and 5). However, if sufficient rotational torque is applied, the hook 60 can rotate 60° to a next position where such a hexagonal faceted base end 62 can fit easily within a similarly faceted bore 54. As another example, a cross-section of these interfacing parts within the swivel 50 could each be twelve sided so that a spacing of 30° would be accommodated, with the hook 60 tending to be held in position at each of these 30° displacement positions therebetween other numbers of facets could alternatively be selected.

With particular reference to FIG. 3, it can be seen how such a hexagonal or twelve sided orientation for the structures forming the swivel 50, as well as the pintle 46 and barrel 43 of both the fixed knuckles 42 and pivoting knuckle 44 within the hinge 40 could each be provided so that the hook can be swiveled or pivoted in a manner which stops at 30° (or 60° or 45°, etc.) spacing intervals. The hooks 60 (optionally two hooks, or preferably at least one hook), can be appropriately oriented to allow the smartphone S to be set up upon an underlying surface in a variety of different orientations. In one orientation, smartphone S is oriented in a portrait orientation with the hook 60 extending substantially horizontally and with the smartphone S angled 60° away from the hook 60 (along angle α of FIG. 3).

In another example, the hook is pivoted to be about perpendicular to the smartphone S and then rotated to be in a plane about perpendicular to the rear surface 20 (by rotation about arrow β of FIG. 3) for supporting of the smartphone S at an angle which is dependent upon a width of the smartphone S and a length of the hook 60, but would in many embodiments be approximately 30° and support the smartphone S at a 60° angle β. In a further example, the hook 60 (or hooks) can be pivoted closer to the collapsed orientation and appropriately swiveled to allow the smartphone S to face more upwardly (such as with an angle δ of approximately 30°).

Control of the pivoting and swiveling through the hinge 40 and swivel 50 also allows the smartphone S to be positioned where desired when suspended from the hooks 60, such as over a top edge of a wall W, such as a cubicle wall, or from other at least partially horizontally extending structures. In embodiments where the case 10 includes two hooks 60 on opposite ends of the case 10, multiple smartphones S can be suspended one from the other, or the second hook can be made available for hanging of other items.

With specific reference to FIGS. 1 and 2, particular details of the hook 60 are described. In this embodiment, the base end 62 extends linearly a short distance defining a trunk 65 which terminates at a first bend 66. This first bend 66 is preferably approximately 90° and transitions into a short arm 72. The short arm 72 extends to a second bend 67 which is also preferably of about 90°, and transitioning into a long arm 74. The long arm 74 has a length defining a majority of an overall length of the hook 60.

The long arm 74 terminates at a third bend 68 (of about 90°) which transitions the long arm 74 into a support arm 76. The support arm 76 terminates at a fourth bend 69 which transitions the support arm 76 into an end arm 78 which extends to the tip 79. The various directions of bending of the bands 66, 67, 68, 69 can be clearly seen, such as in FIGS. 1 and 2.

Figure 8:
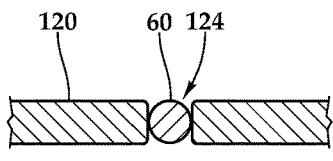
FIG. 8 is a sectional view of that which is shown in FIG. 6, but for a third embodiment with the recess having a depth similar to a thickness of the rear wall of the case, so that the recess extends entirely through the rear wall.
Figure 9:
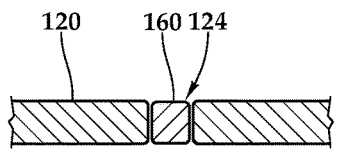
FIG. 9 is a sectional view of that which is shown in FIG. 6, but for a fourth embodiment with the recess having a depth similar to a thickness of the rear wall of the case, and with the hook having a primarily square cross-section.

The relative lengths of the trunk 65 and arms 72, 74, 76, 78 can also be discerned from a review of FIGS. 1 and 2. The support arm 76 is preferably substantially perpendicular to the trunk 65 to facilitate having a line (or surface if appropriately flattened) of contact with a tabletop or other underlying surface, rather than just point of contact, and to keep the smartphone S as stable as possible when resting upon an underlying surface such as that depicted in FIG. 3. The hook 60 can have either a circular cross-section (FIGS. 6 and 8) or a primarily square cross-section (FIGS. 7 and 9), or can have other cross-sectional configurations if desired.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:
1. A case for a smartphone, comprising in combination:
a rear wall sized and shaped to contain a rear surface of a smartphone;
a perimeter wall extending perpendicularly from edges of the rear wall to at least partially contain the smartphone;
the rear wall of the case including a rear surface on a side thereof opposite said perimeter wall, said rear surface having a recess therein;
at least one hook pivotably attached to a corner between said rear wall of said case and said perimeter wall of said case;
said hook pivotable between a collapsed orientation residing at least partially within said recess and a deployed orientation pivoted out of said recess and away from said rear wall of said case;

wherein a pivot joint is interposed between a base end of said hook and said corner between said rear wall of said case and said perimeter of said case; and wherein said pivot joint includes at least two fixed knuckles affixed to said corner with a barrel passing therethrough and with a pintle located within said barrel, and wherein said hook is pivotably mounted to said pintle through a pivoting knuckle between said at least two fixed knuckles.

2. The case of claim 1 wherein at least said perimeter wall is formed of flexible resilient material.

3. The case of claim 1 wherein said recess is shaped like a hook.

4. The case of claim 3 wherein said recess is sized to receive a majority of said hook therein when said hook is pivoted into said collapsed orientation.

5. The case of claim 4 wherein said recess extends entirely through said rear wall.

6. The case of claim 1 wherein a swivel joint is interposed between said corner between said rear wall of said case and said perimeter wall of said case and a base end of said hook.

7. A case for a smartphone, comprising in combination:

a rear wall sized and shaped to contain a rear surface of a smartphone;

a perimeter wall extending perpendicularly from edges of the rear wall to at least partially contain the smartphone;

the rear wall of the case including a rear surface on a side thereof opposite said perimeter wall, said rear surface having a recess therein;

at least one hook pivotably attached to a corner between said rear wall of said case and said perimeter wall of said case;

said hook pivotable between a collapsed orientation residing at least partially within said recess and a deployed orientation pivoted out of said recess and away from said rear wall of said case;

wherein a swivel joint is interposed between said corner between said rear wall of said case and said perimeter wall of said case and a base end of said hook;

wherein said pivot joint is interposed between said base end of said hook and said corner between said rear wall of said case and said perimeter of said case;

wherein said pivot joint includes at least two fixed knuckles affixed to said corner with a barrel passing therethrough and with a pintle located within said barrel, and wherein said hook is pivotably mounted to said pintle through a pivoting knuckle between said at least two fixed knuckles; and wherein said swivel joint is interposed between said pivot joint and said base end of said hook, said swivel joint including a collar with a bore extending thereinto, and with said base end of said hook extending into said bore in said collar, said base end having a contour which facilitates rotation of said base end relative to said bore within said collar, said bore within said collar including a step causing deep portions of said bore to have a greater width than shallow portions of said bore, said base end of said hook having an extremity thereof which is greater in width than portions thereof spaced from said base end, such that when said base end of said hook is located within said bore, said hook resists linear translation out of said bore, while allowing rotation of said base end of said hook relative to said bore.

8. A smartphone case, comprising in combination:

a rear wall having a generally rectangular shape;

a perimeter wall extending forward from said rear wall, and surrounding a compartment sized to contain a smartphone;

at least one hook movably attached to at least one of said rear wall and said perimeter wall;

said hook movable between a collapsed orientation and a deployed orientation, said deployed orientation locating a majority of said hook further from said rear wall than said collapsed orientation;

wherein a pivot joint is interposed between a base end of said hook and said corner between said rear wall of said case and said perimeter of said case; and wherein said pivot joint includes at least two fixed knuckles affixed to said corner with a barrel passing therethrough and with a pintle located within said barrel, and wherein said hook is pivotably mounted to said pintle through a pivoting knuckle between said at least two fixed knuckles.

9. The smartphone case of claim 8 wherein a recess is located within said rear wall, on a side of said rear wall opposite said compartment.

10. The smartphone case of claim 9 wherein said recess is shaped like a hook.

11. The smartphone case of claim 10 wherein said recess fits a majority of said hook therein when said hook is in said collapsed orientation.

12. The smartphone case of claim 11 wherein said hook has a primarily square cross-section.

13. The smartphone case of claim 11 wherein said hook has a primarily circular cross-section.

14. The smartphone case of claim 8 wherein said hook includes a flat support arm on a portion of said hook spaced from a base end of said hook located adjacent to said rear wall.

15. The smartphone case of claim 8 wherein a swivel joint is interposed between said rear wall of said case and said base end of said hook.

\* \* \* \* \*